United States Patent [19]
Schwaiger

[11] 3,836,173
[45] Sept. 17, 1974

[54] ANTI-THEFT STRUCTURE FOR TRAVEL TRAILERS

[76] Inventor: John E. Schwaiger, 7556 Raleigh La Grange Rd., Cordova, Tex. 38018

[22] Filed: July 20, 1973

[21] Appl. No.: 381,365

[52] U.S. Cl. .......................................... 280/150.5
[51] Int. Cl. ............................................. B60s 9/00
[58] Field of Search .......... 280/150.5, 475, 65, 507

[56] References Cited
UNITED STATES PATENTS
2,628,126  2/1953  Black .............................. 280/475 X
3,715,141  2/1973  Cary ................................ 280/150.5

Primary Examiner—Stanley H. Tollberg
Attorney, Agent, or Firm—John R. Walker, III

[57] ABSTRACT

Anti-theft structure for travel trailers including fore and aft spurs depending from the fore and aft ends of the trailer. In normal use, the spurs do not support the trailer but rather thrustingly engage the ground, or other surface upon which the trailer is resting, when an attempt is made to move the trailer. The respective spurs are slidably received in vertically disposed tubular housing members which define openings through the floor of the trailer. Accordingly, the upper ends of the spurs are accessible only from the interior of the trailer. Thus, when the door to the trailer is locked, access to the upper ends of the spurs is denied. The upper ends of the spurs are securely held in selected ones of several extended vertical positions by holding structure which may be actuated only from the interior of the trailer. Additionally, the respective holding structure may be secured to the housing members by suitable padlocks or the like to provide further assurance against unwarranted removal of the spurs.

7 Claims, 5 Drawing Figures

3,836,173

ANTI-THEFT STRUCTURE FOR TRAVEL TRAILERS

BACKGROUND OF THE INVENTION

1. Field of the Invention

This invention relates to devices for preventing theft of travel trailers.

2. Description of the Prior Art

A preliminary patentability search revealed the following U.S. Pats: Dalton, Pat. No. 3,182,956; Taylor, Pat. No. 3,475,008; Curtis, Pat. No. 3,625,542; and Bristol, Pat. No. 3,656,778. None of the above patents suggest or disclose applicant's structure. As a matter of fact, none of the above patents disclose anti-theft structure for a travel trailer. More specifically, the above patents disclose various ways of supporting or stabilizing a trailer.

It should be mentioned that the applicant is the inventor of U.S. Pat. No. 3,695,631 entitled "Anti-Theft Device for Trailers." The '631 patent is directed toward preventing theft of light utility trailers, e.g., a boat trailer or the like, which is usually not parked with the frame thereof parallel with the surface upon which the trailer is resting, unlike a travel trailer which preferably is parked with the frame thereof parallel with the supporting surface.

SUMMARY OF THE INVENTION

The concept of the present invention is to provide anti-theft structure for travel trailers which when installed enables the travel trailer to be parked in the usual manner, i.e., with the frame thereof being parallel with the ground or the surface upon which the trailer is resting. The anti-theft structure herein disclosed includes fore and aft spurs or pseudostanchion means depending from the fore and aft portion of the trailer. In other words, the spurs resemble stanchions or supporting members but in normal use they do not support the trailer but rather obstructively or thrustingly engage the ground or the surface upon which the trailer is resting when an attempt is made to move the trailer. Housing means are included which provide fore and aft openings through the floor of the trailer which slidably receive the respective fore and aft spurs. Accordingly, the upper ends of the spurs are accessible only from the interior of the trailer. Thus, when the door of the trailer is locked, access to the upper ends thereof is denied.

Holding means, e.g., fore and aft pins or the like, are included which coact with the respective housing means and the fore and aft spurs for securely holding the spurs in selected ones of several extended vertical positions. The holding means engage the spurs adjacent the upper ends thereof and are accessible only from the interior of the trailer.

Additionally, the holding means may be further secured by suitable padlocks or the like to provide additional assurance against unwarranted removal of the spurs. From the above it should be apparent that a would-be thief would first have to break into the interior of the travel trailer and then disengage the padlocks, the holding structure, and the spurs prior to being able to move the travel trailer.

The anti-theft structure herein disclosed is distinguished among other features by the following: It can only be operated from inside the trailer. This not only provides double security as above disclosed but also offers convenience. In other words, the interior lights of the trailer provide light for installing the structure during the hours of darkness. Additionally, the interior provides shelter for installing the structure during inclement weather. Further, the structure may be pulled up inside the trailer and stored in place with very little effort.

DESCRIPTION OF THE PREFERRED EMBODIMENT

Figure 4:
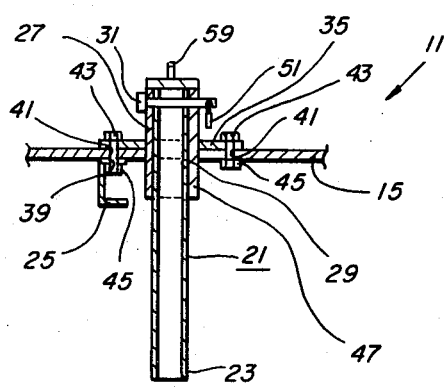
FIG. 4 is a sectional view of the anti-theft structure of the present invention taken as on the vertical center line thereof and being shown as suitably attached to the travel trailer.

The anti-theft device 11 of the present invention is best shown in FIG. 4 of the drawing and is intended to be attached to a travel trailer 13 to prevent the theft thereof. The travel trailer 13 includes a floor 15 and a drawbar 17 which is normally movable downwardly and upwardly for respective engagement and disengagement with hitch apparatus, as at 19, of a towing vehicle (not shown).

Figure 5:
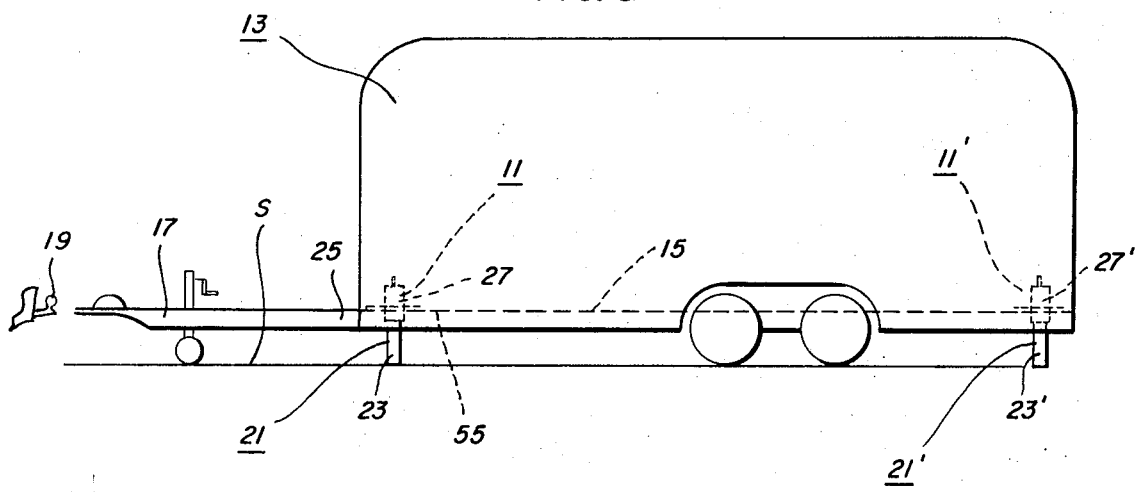
FIG. 5 is a side elevational view of a typical travel trailer showing a pair of anti-theft devices of the present invention suitably attached thereto.

From FIG. 5 of the drawing it may be seen that the anti-theft structure herein disclosed preferably includes at least a pair of anti-theft devices 11 which are located fore and aft of the trailer 13, i.e., the forward anti-theft device being character referenced by the numeral 11 and the rearward anti-theft device being character referenced by the numeral 11'. In other words, the fore and aft antitheft devices 11, 11' are identical one with the other and include structure depicted in FIGS. 1 through 4 of the drawing and yet to be disclosed.

Figure 3:
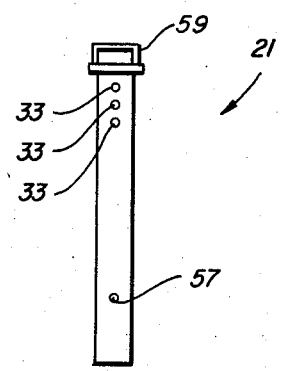
FIG. 3 is a side elevational view of the spur or pseudostanchion of the present invention.

The forward anti-theft device 11 includes first pseudostanchion means or spur means 21 as best depicted in FIG. 3 of the drawing. The spur means 21 has an extended position wherein the lower end 23 thereof becomes obstructively engaged with the surface S upon which the trailer 13 is resting, i.e., when an attempt is made to lower the drawbar 17. The aft anti-theft device 11' includes second pseudostanchion means or spur means 21' also having an extended position wherein the lower end 23' thereof becomes obstructively engaged with the surface S upon which the trailer is rested when an attempt is made to move the drawbar upwardly. In other words, the drawbar 17 is prevented from being moved upwardly or downwardly from an intermediate or optimum position, i.e., the trailer 13 includes frame structure, as at 25, which is substantially parallel with the surface S when the drawbar 17 is in the above-mentioned optimum position.

The fore and aft anti-theft devices 11, 11' respectively include fore and aft housing means 27, 27' providing openings, as at 29 in FIG. 4 of the drawing, through the floor 15 with the openings 29 respectively slidably receiving the first and second spur means 21, 21'. Also included are fore and aft holding means, only one of which is shown, as at 31, in FIGS. 2 and 4 of the drawing, respectively coacting with the fore and aft housing means 27, 27' and the first and second spur means 21, 21' for respectively securely holding the first and second spur means 21, 21' in their extended positions.

Figure 2:
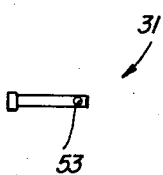
FIG. 2 depicts the holding pin which is free to slide through the horizontal hole of the housing depicted in FIG. 1.

The anti-theft devices 11, 11' include means, as for example a plurality of holes 33 provided in the spur means 21, 21', for providing the spur means 21, 21' with a plurality of selected extended vertical positions. The holding means 31, preferably being a pin as shown in FIG. 2, is selectively operable for securely holding the spur means 21, 21' in any one of their plurality of vertical positions.

More specifically, each of the housing means 27, 27' includes a horizontally disposed flange member, as at 35, which is provided with a plurality of vertically aligned holes 37. The flange portion 35 contiguously engages the floor 15 preferably adjacent certain frame structure 25 of the trailer 13. Accordingly, the frame structure 25 is provided with at least one hole 39 and the floor 15 is provided with a plurality of holes as at 41 for receiving suitable securing means, e.g., bolts 43 which are secured with nuts 45. Therefore, the housing means 27, 27' are rigidly attached to the frame structure 25 of the trailer 13.

Figure 1:
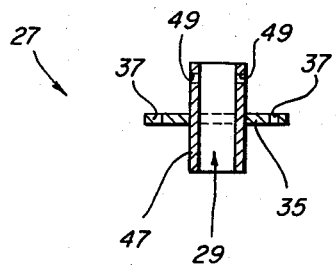
FIG. 1 is a sectional view taken as on the vertical center line of the housing which provides an opening through the floor of the travel trailer, showing vertically aligned holes for attachment to the floor structure and a horizontally aligned hole for receiving a holding pin.

Each of the housing means 27, 27' also includes a vertically disposed tubular member 47, as shown in FIGS. 1 and 4 of the drawing, defining the opening 29 which receives the respective spur means 21, 21'. The tubular member 47 is provided with an aperture 49, i.e., the aperture 49 extends through opposite walls of the member 47, for slidably receiving the holding means or pin 31. In other words, the spur means 21, 21' are placed in the desirable extended positions for proper registering of the appropriate holes 33 with the aperture 49 and the holding means or pin 31 extends through the tubular member 47 and the spur means 21, 21'. The antitheft device 11 of the present invention preferably includes lock means, as at 51, which engages the holding means or pin 31 for preventing unwarranted disassociation of the pin 31, the housing means 27, and the spur means 21 respectively one from the other. More specifically, the pin 31 is provided with a transverse aperture 53 for receiving the lock means 51, i.e., the lock means 51 preferably being a typical padlock as clearly shown in FIG. 4 of the drawing.

It should be understood that one of the anti-theft devices, e.g., the rearward anti-theft device 11', may be deleted without departing from the spirit and scope of the present invention. In other words, it may be desirable for certain travel trailers 13 that only one anti-theft device 11 be included to constitute the anti-theft structure herein disclosed. In this event, the anti-theft device 11 preferably is located at the forward portion, as at 55, of the floor 15 adjacent the drawbar 17. Further, when only the forward anti-theft device 11 is included it may be desirable that the spur means 21 thereof be somewhat longer than when two anti-theft devices 11, 11' are included. In other words, when only one anti-theft device 11 is included the spur means 21 thereof should be sufficiently long enough so that the drawbar 17 could not be lowered to a height where it could be engaged with hitch apparatus 19 of a towing vehicle (not shown). Obviously, in this latter instance it is conceivable that the frame structure 25 will not necessarily be parallel with the supporting surface S.

The spur means 21 preferably is provided with an additional transverse hole, as at 57, for receiving the holding pin 31 when the spur means 21 is in a stowed position, i.e., the trailer 13 being in a condition to be towed. In this regard, the spur means 21 preferably includes a handle 59 to facilitate manipulation of the spur means 21, i.e., manually moving it between the extended positions and the stowed position.

Although the invention has been described and illustrated with respect to a preferred embodiment thereof, it is to be understood that it is not to be so limited since changes and modifications may be made therein which are within the full intended scope of the invention.

I claim:

1. The combination with a travel trailer having a floor and a drawbar which is normally movable downwardly and upwardly for respective engagement and disengagement with hitch apparatus of a towing vehicle, of at least one anti-theft device for safeguarding the trailer against theft, said anti-theft device comprising pseudostanchion means having an extended position wherein the lower end thereof is obstructively engaged with the surface upon which said trailer is resting when an attempt is made to lower said drawbar to a compatible height with the towing vehicle hitch apparatus thus preventing said drawbar from being lowered onto the hitch apparatus, housing means providing an opening through said floor with said opening slidably receiving said pseudostanchion means, and holding means coacting with said housing means and said pseudostanchion means for securely holding said pseudostanchion means in said extended position, said holding means being accessible only from the interior of the trailer.

2. The combination of claim 1 in which said antitheft device is located at the forward portion of said floor adjacent said drawbar.

3. The combination of claim 1 in which is included lock means engaging said holding means for preventing unwarranted disassociation of said holding means; said housing means, and said pseudostanchion means one from the other.

4. The combination with a travel trailer having a floor and a drawbar which is normally movable downwardly and upwardly for respective engagement and disengagement with hitch apparatus of a towing vehicle, of at least a pair of anti-theft devices located fore and aft of said trailer, said fore anti-theft device comprising first pseudostanchion means having an extended position wherein the lower end thereof becomes obstructively engaged with the surface upon which the trailer is resting when an attempt is made to lower said drawbar, said aft anti-theft device comprising second pseudostanchion means having an extended position wherein the lower end thereof becomes obstructively engaged with the surface upon which the trailer is rested when an attempt is made to move said drawbar upwardly, said fore and aft anti-theft devices respectively including fore and aft housing means providing openings through said floor with said openings respectively slidably receiving said first and second pseudostanchion means, and fore and aft holding means respectively coacting with said fore and aft housing means and said first and second pseudostanchion means for respectively securely holding said first and second pseudostanchion means in said extended positions, said fore and aft holding means being accessible only from the interior of the trailer.

5. The combination of claim 4 in which said fore and aft anti-theft devices respectively include fore and aft lock means engaging said fore and aft holding means for preventing unwarranted disassociation of said fore and aft holding means; said fore and aft housing means, and said first and second pseudostanchion means respectively one from the other.

6. The combination of claim 1 in which said antitheft device includes means for providing said pseudostanchion means with a plurality of selected extended vertical positions, and said holding means being selectively operable for securely holding said pseudostanchion means in any one of said plurality of vertical positions.

7. The combination of claim 4 in which said fore and aft anti-theft devices respectively include means for providing said first and second pseudostanchion means with several selectable extended vertical positions, and said fore and aft holding means respectively being selectively operable for securely holding said first and second pseudostanchion means in any one of said several vertical positions.

* * * * *

UNITED STATES PATENT OFFICE
CERTIFICATE OF CORRECTION

Patent No. 3,836,173  Dated September 17, 1974

Inventor(s) John E. Schwaiger

It is certified that error appears in the above-identified patent and that said Letters Patent are hereby corrected as shown below:

On the Title page, in item [76] "Cordova, Tex." should be -- Cordova, Tennessee --.

Signed and sealed this 17th day of December 1974.

(SEAL)
Attest:

McCOY M. GIBSON JR.
Attesting Officer

C. MARSHALL DANN
Commissioner of Patents